(12) United States Patent
Fournie et al.

(10) Patent No.: US 9,839,300 B2
(45) Date of Patent: Dec. 12, 2017

(54) REDUCED OUTFLOW INFLATION VALVE

(71) Applicant: Roho, Inc., Belleville, IL (US)

(72) Inventors: Glenn G. Fournie, Smithton, IL (US); Kevin C. Meier, St. Louis, MO (US)

(73) Assignee: ROHO, INC., Belleville, IL (US)

( * ) Notice: Subject to any disclaimer, the term of this patent is extended or adjusted under 35 U.S.C. 154(b) by 128 days.

(21) Appl. No.: 14/435,820

(22) PCT Filed: Nov. 18, 2014

(86) PCT No.: PCT/US2014/066182
§ 371 (c)(1),
(2) Date: Apr. 15, 2015

(87) PCT Pub. No.: WO2015/116305
PCT Pub. Date: Aug. 6, 2015

(65) Prior Publication Data
US 2016/0007764 A1    Jan. 14, 2016

Related U.S. Application Data

(60) Provisional application No. 61/933,021, filed on Jan. 29, 2014.

(51) Int. Cl.
*F16K 17/26*    (2006.01)
*A47C 27/10*    (2006.01)
*A47C 7/02*    (2006.01)
*F16K 15/20*    (2006.01)

(52) U.S. Cl.
CPC ............. *A47C 27/10* (2013.01); *A47C 7/02* (2013.01); *F16K 15/20* (2013.01); *Y10T 137/778* (2015.04)

(58) Field of Classification Search
CPC ............. Y10T 137/3584; Y10T 137/36; Y10T 137/3646; Y10T 137/778; Y10T 137/7771; A47C 27/10; A47C 7/02; F16K 15/20
USPC ......................................................... 137/226
See application file for complete search history.

(56) References Cited

U.S. PATENT DOCUMENTS 3,542,062 A * 11/1970 Jacobellis ............... F16K 1/307
137/226
5,561,875 A * 10/1996 Graebe ................ A61G 5/1043
297/180.13
6,564,410 B2    5/2003 Graebe et al.
6,623,080 B2    9/2003 Clapper
(Continued)

FOREIGN PATENT DOCUMENTS

EP    2662063 A1    11/2013

OTHER PUBLICATIONS

PCT International Search report for International Application No. PCT/US2014/066182 dated Mar. 25, 2015.
(Continued)

*Primary Examiner* — Jessica Cahill
(74) *Attorney, Agent, or Firm* — Polsinelli, PC

(57) ABSTRACT

A reduced outflow valve in fluid communication with an inflatable apparatus comprising a tubular body defining an inner bore and a plunger slidingly engaged in the bore. Inflation of the inflatable apparatus urges the plunger to a first position configured to allow rapid ingress of air into the cushion to inflate the cushion and deflation of the inflatable apparatus urges the plunger to a second position wherein the plunger is configured as a baffle to dampen or slow air egress during release of air.

18 Claims, 9 Drawing Sheets

(56) References Cited

U.S. PATENT DOCUMENTS

| | | | |
|---|---|---|---|
| 6,687,936 B2 | 2/2004 | Graebe et al. | |
| 7,021,326 B2 * | 4/2006 | Rogier | B63C 9/24 137/226 |
| 7,624,752 B2 * | 12/2009 | Huang | F16K 15/207 137/226 |
| 7,997,296 B2 * | 8/2011 | Teng | F16K 15/06 137/226 |
| 8,348,227 B2 * | 1/2013 | Zoller | G05D 7/0133 137/504 |
| D682,394 S | 5/2013 | Sprouse | |
| 2002/0128572 A1 | 9/2002 | Chang | |
| 2004/0045090 A1 | 3/2004 | Tsai | |
| 2004/0089349 A1 * | 5/2004 | Meyer | F16K 15/142 137/517 |
| 2005/0211303 A1 * | 9/2005 | Yu | B62D 5/062 137/493.9 |
| 2008/0047613 A1 * | 2/2008 | Huang | F16K 15/20 137/226 |
| 2008/0157019 A1 | 7/2008 | Lin | |
| 2010/0096572 A1 * | 4/2010 | Teng | F16K 15/20 251/93 |
| 2012/0160335 A1 * | 6/2012 | Thyroff | F02M 21/0239 137/14 |
| 2013/0264157 A1 | 10/2013 | Shen | |

OTHER PUBLICATIONS

PCT Written Opinion of the International Searching Authority International Application No. PCT/US2014/066182 dated Mar. 25, 2015.

* cited by examiner

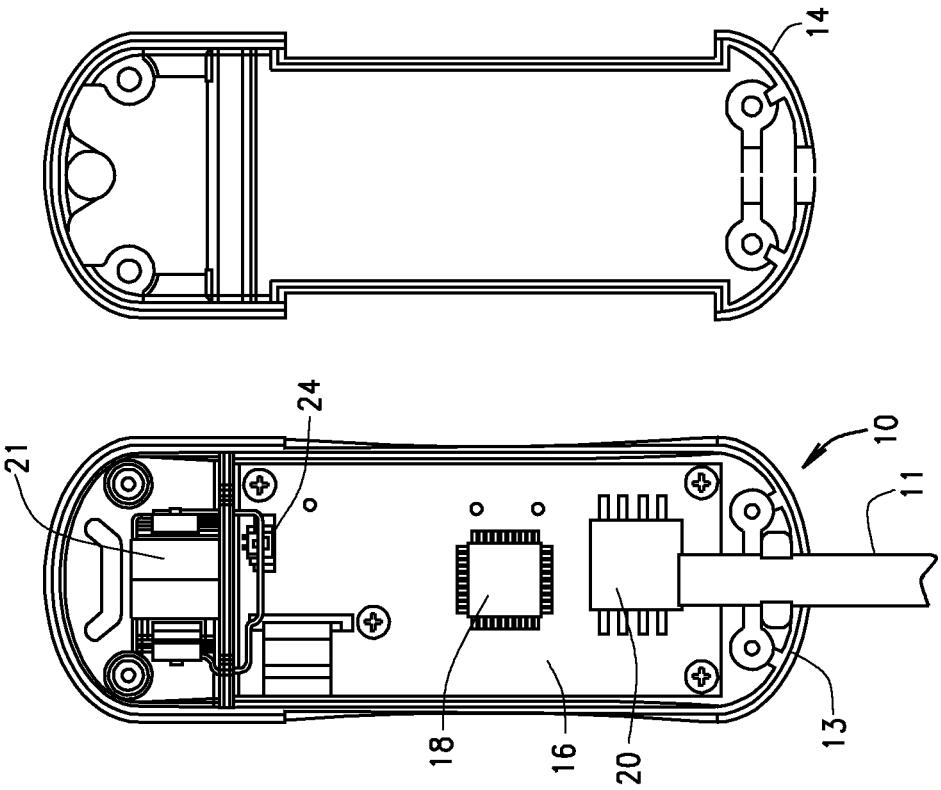
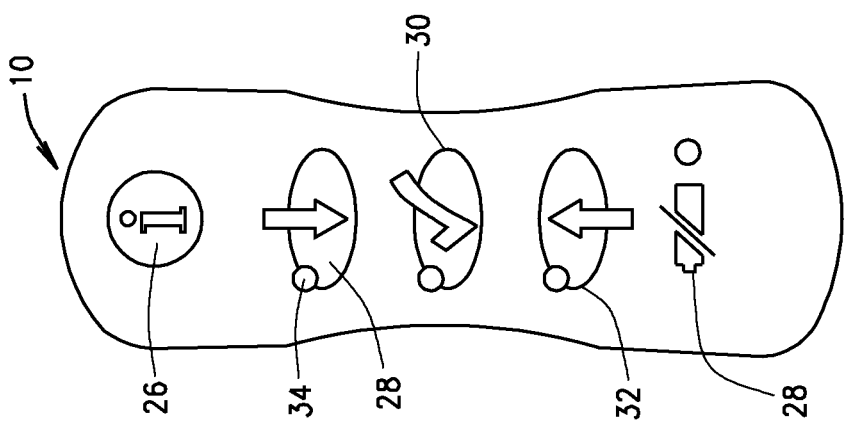

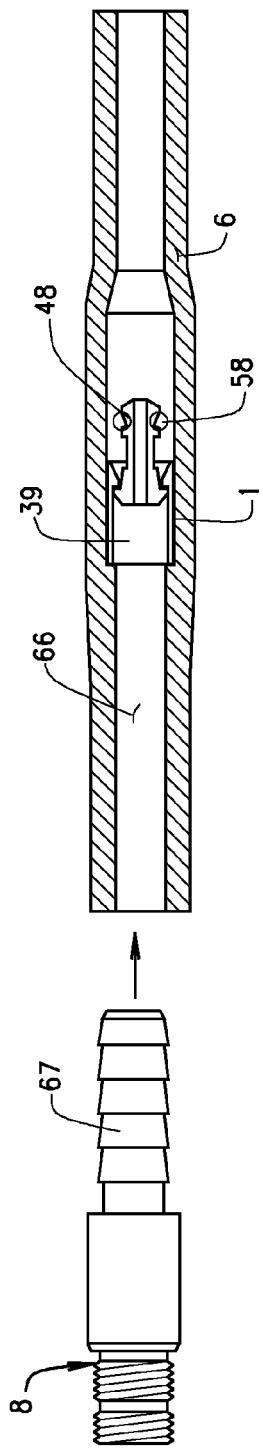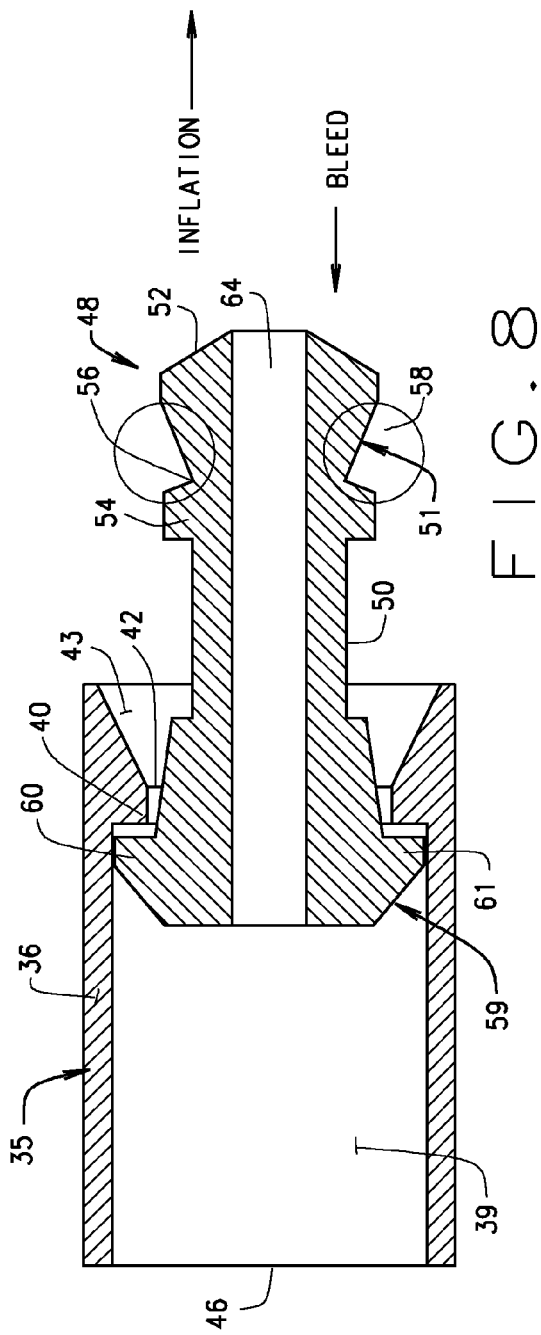

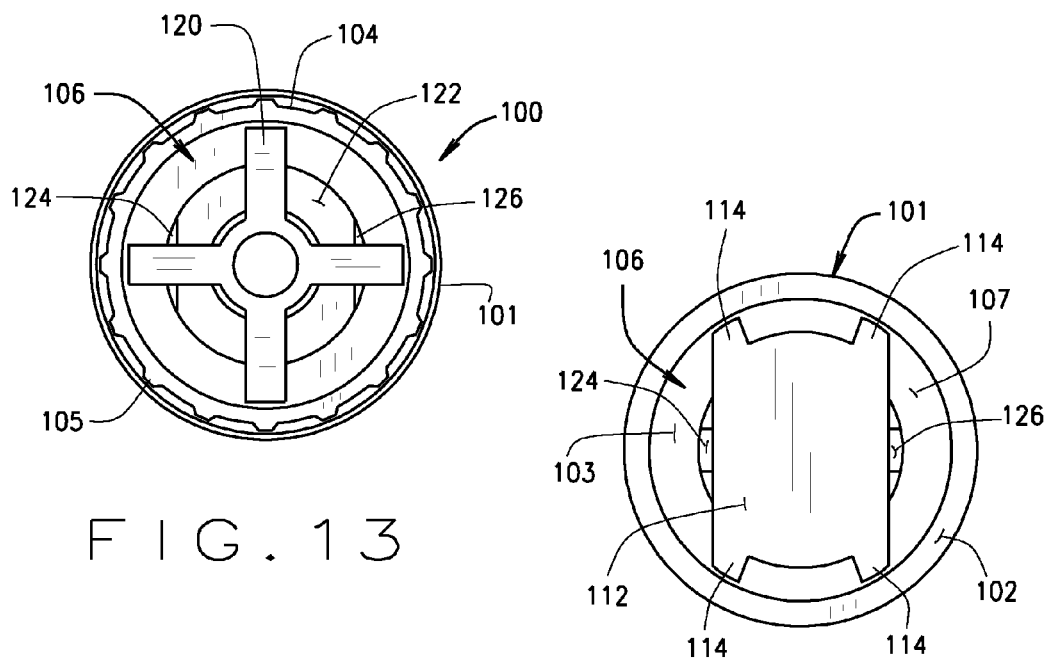
FIG. 13
FIG. 14
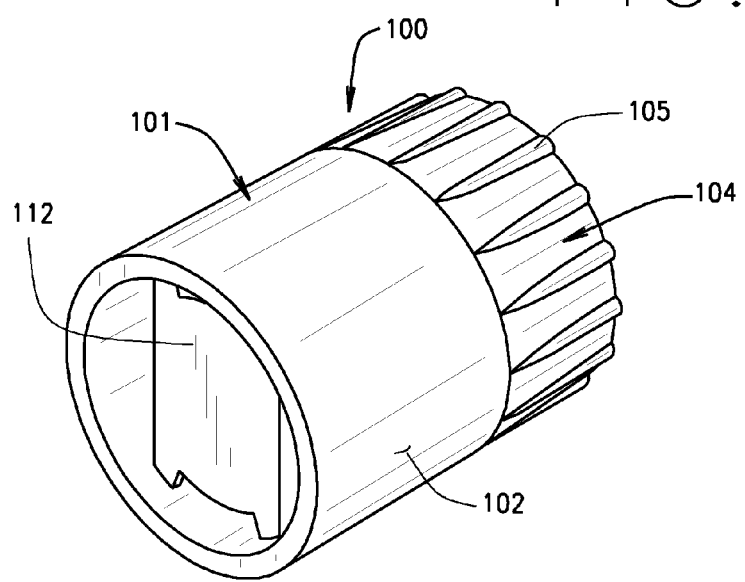
FIG. 15

REDUCED OUTFLOW INFLATION VALVE

RELATED APPLICATIONS

This application is the United States National Stage under 35 U.S.C. §371 of International Application Serial No. PCT/US2014/066182 having an International filing date of Nov. 18, 2014 which claims the benefit of U.S. Provisional Patent Application Ser. No. 61/933,021, filed Jan. 29, 2014, and is related to International Application Serial No. PCT/US2014/066181, all of which are incorporated herein by reference.

BACKGROUND ART

The disclosure relates generally a valve to control the egress of air out of an inflated apparatus. The inflated apparatus can be an inflatable cushion or mattress.

Inflatable apparatus are known to the art and are provided in a plethora of configurations for a number of different uses. Inflatable air cell seat cushions are one type of an inflatable apparatus. Generally air cell seat cushions are used by individuals who must remain seated for extended periods of time, for example, a disabled individual who uses a wheelchair for locomotion. Larger air cell cushions, generally configured as mattresses, are used by non-ambulatory or bed ridden individuals. In any event, inflatable air cell cushions are employed to prevent pressure sores on the buttocks or at other bony prominences. These air cell cushions provide support, while distributing weight, generally uniformly through a multiplicity of interconnected air cells.

The typical air cell cushion includes a base and an array of interconnected, upstanding individual air cells, usually arranged in transverse and longitudinal rows. An air inflation tube is in fluid communication with one of the cells. The inflation tube includes a screw type valve. A representative embodiment of such an air cell is disclosed in U.S. Pat. No. 4,541,136, which is incorporated herein by reference.

For proper seating on the cushion, the cushion is placed on a relatively firm or hard support surface, such as a wheelchair seat or other type of seat or chair. The individual or caregiver (either one referred to as "the user") opens the inflation valve and pumps air into the cushion until it is well inflated. The user then sits on the cushion and air is released through the valve until the user is optimally immersed in the air cell cushion. The valve then is closed. Proper immersion optimizes weight distribution and reduces pressure on the anatomy. Controlling the outflow of air from the cushion is important so the cushion does not deflate too rapidly. Rapid deflation can result in overshooting a proper immersion point requiring re-inflation and repetition of the deflation step.

It would be advantageous, therefore, to have an apparatus that controls the rate of outflow from an inflatable apparatus such as an air cell cushion such that the user can achieve optimum immersion in the cushion without overshooting the optimal level of immersion. Moreover, it would be advantageous to have such an apparatus that does not unduly impede inflation of the inflatable apparatus.

SUMMARY OF THE INVENTION

One aspect of the disclosure provides for a reduced outflow valve for use with an inflatable apparatus. One example of an inflatable apparatus is an inflatable air cell cushion. The valve may be installed within inflation tubing in fluid communication with the inflatable apparatus. The valve allows rapid ingress of air into the cushion to inflate the cushion, but functions as a baffle to dampen or slow air egress during release of air and immersion of the user.

In another aspect, the reduced outflow valve comprises a body dimensioned to seat within the inflation tubing. The body defines a longitudinal bore. A plunger is slidingly engaged in the bore and is movable from a first to second position. The plunger is urged to the first position by the force of air through the inflation tubing and the valve during inflation of the air cell cushion. The valve is configured in the first position to allow airflow through the reduced valve and into the cushion relatively unimpeded. When the inflation tubing is opened to partially deflate or bleed air from the cushion, the force of the outflow air urges the plunger to the second position wherein the valve is configured to partially impede or slow down outflow through the valve.

In another aspect, a reduced outflow valve for installation in inflation tubing in fluid communication with an inflatable apparatus comprising a tubular body defining an inner bore and a plunger slidingly engaged in the bore. Inflation of the inflatable apparatus through the inflation tubing urges the plunger to a first position where it is disposed within the bore to allow rapid ingress of air into the inflatable apparatus and deflation of the inflatable apparatus through the inflation tubing urges the plunger to a second position wherein the plunger is disposed within the bore to dampen or slow air egress during release of air from the inflatable apparatus.

In another aspect, the reduced outflow valve can be included with the inflation valve or in any other structure or element as long as the valve is in fluid communication with the inflatable apparatus.

In one aspect, the reduced outflow valve effectively prevents overshooting optimal immersion depth during release of air from the cushion.

BRIEF DESCRIPTION OF THE DRAWINGS

FIG. 2 is a top plan view of one aspect of a sensor;

FIG. 3 is a top plan view of the embodiment of the sensor of FIG. 2 with the top of the casing removed to show internal structures;

FIG. 7 is an exploded side elevational view of the inflation valve and tubing with the tubing and reduced outflow valve in cross-section;

FIG. 8 is an enlarged cross-sectional view of the reduced outflow valve in an outflow restricted position;

FIG. 13 is a proximal end plan view of another aspect of the reduced outflow valve;

FIG. 14 is a distal end plan view thereof;

FIG. 15 is a distal perspective view thereof;

BEST MODE FOR CARRYING OUT THE INVENTION

The present disclosure is directed to a reduced outflow valve for use with an inflatable apparatus. In general, the reduced outflow valve comprises a tubular body dimensioned to seat within the inflation tubing. The body defines a longitudinal bore. A plunger is slidingly engaged in the bore and is movable from a first to second position. The plunger is urged to the first position by the force of air during inflation of the air cell cushion. The valve is configured in the first position to allow relatively unimpeded airflow through the valve and into the cushion. When the inflation tubing is opened to partially deflate or bleed air from the cushion, the force of the outflow air urges the plunger to the second position wherein the valve is configured to impede outflow through the valve.

The reduced outflow valve requires a minimal number of parts and does not require the use of a spring or any other mechanical biasing means.

It will be noted that for the purposes of simplicity and clarity the reduced outflow valve is disclosed in use with an inflatable air cell cushion. However, the reduced outflow valve can be used with any inflatable apparatus such as a cushion, a mattress, a vehicle seat cushion, a bladder, a cellular cushion or mattress, a single compartment inflatable apparatus, an inflatable raft, inflatable boat, flotation device or any inflatable apparatus. Uses for the reduced outflow valve are unlimited and the disclosure and appended claims should be construed broadly and not narrowly to encompass use only with an inflatable air cell cushion or the like.

The reduced outflow valve is described as being installed or positioned in an airflow conduit for purposes of simplicity. However, the valve may be positioned anywhere within such a conduit between an inflatable apparatus and an inflation valve, for example, or may be a component of an inflation valve. It may be included in any tubing, structure or element as long as it is in fluid communication with the inflatable apparatus.

Also, it will be noted that when terms of orientation such as proximal and distal are used, proximal is intended to mean orientated toward the air conduit inflation valve and distal is intended to mean orientated toward the inflatable apparatus.

Figure 1:
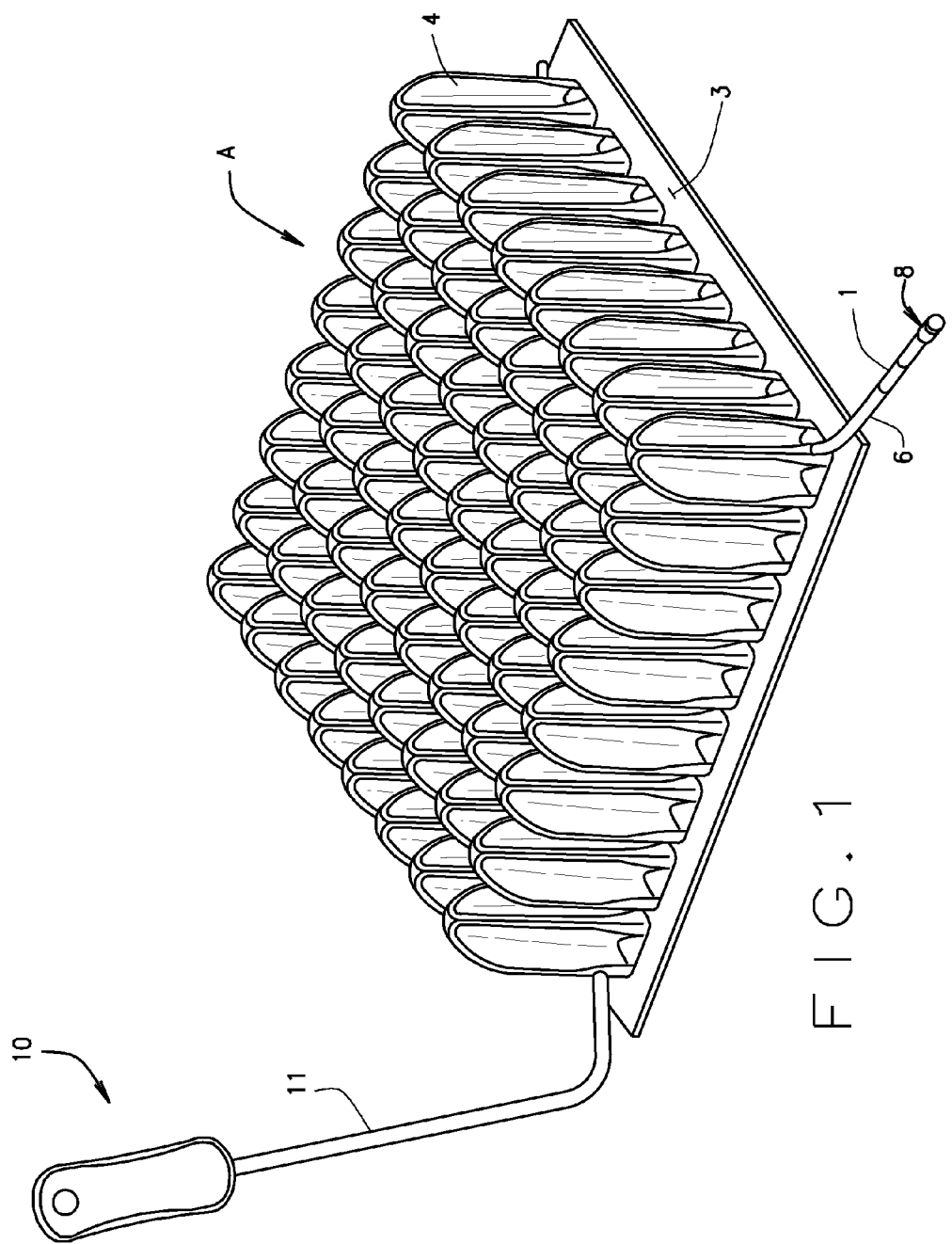
FIG. 1 is a perspective view of an air cell cushion employing the reduced outflow valve of the present disclosure.

A reduced outflow valve is indicated generally be reference numeral 1 in the drawings. Valve 1 is shown in use with an air cell cushion A in FIG. 1. Air cell cushion A, as shown, is representative of inflatable apparatus only. The typical air cell cushion A includes a base 3, and an array of interconnected, upstanding individual air cells 4, usually arranged in transverse and longitudinal rows. An air inflation tube 6 is in fluid communication with one of the cells at its distal end. The inflation tube includes a screw type valve 8 at its proximal end. Valve 1 is positioned in inflation tube 6.

Air cells 4 are in fluid communication through air channels formed in base 3 so that air introduced into the cushion through inflation tube 6 flows into all the cells until the air pressure is equalized among the cells. A representative embodiment of such an air cell is disclosed in U.S. Pat. No. 4,541,136, which is incorporated herein by reference.

To demonstrate one aspect of the utility of valve 1, cushion A is equipped with an immersion sensor 10, shown in greater detail in FIGS. 2 and 3 in fluid communication with the cushion through conduit 11. Immersion sensor 10 includes a housing, generally of a clamshell configuration comprising a bottom section 13 and top section 14. Representative internal components of sensor 10 include a circuit board 16, a microprocessor 18, a pressure transducer 20 and one or more batteries 21 to power the sensor. In one aspect, a plurality of disk-shaped or coin batteries 21 are employed. A power connection 24 connects the batteries to the circuit board. As shown, conduit 11 is in fluid communication with pressure transducer 20.

Referring again to FIG. 2, sensor 10 includes an inquiry button 26, a remove air icon 28 (down arrow or other representation of remove air action), a check mark 30 (indicating status ok) and an add air icon 32 (an up arrow or other representation of add air action). It will be understood that the buttons and graphical indicia may have LEDs, indicated by circles 34 next to the graphics, which illuminate to indicate status or buttons and graphics. The icons and buttons also may be backlit, for example by LED lights, to be highly visible, even in the dark. The graphical indicia or icons shown are intended to be representative only. For example, any indicia, icons or words, lights, or indicators that readily denote the intended function of the underlying buttons or information to be imparted, as will be described below, may be employed with sensor 10.

Figure 4:
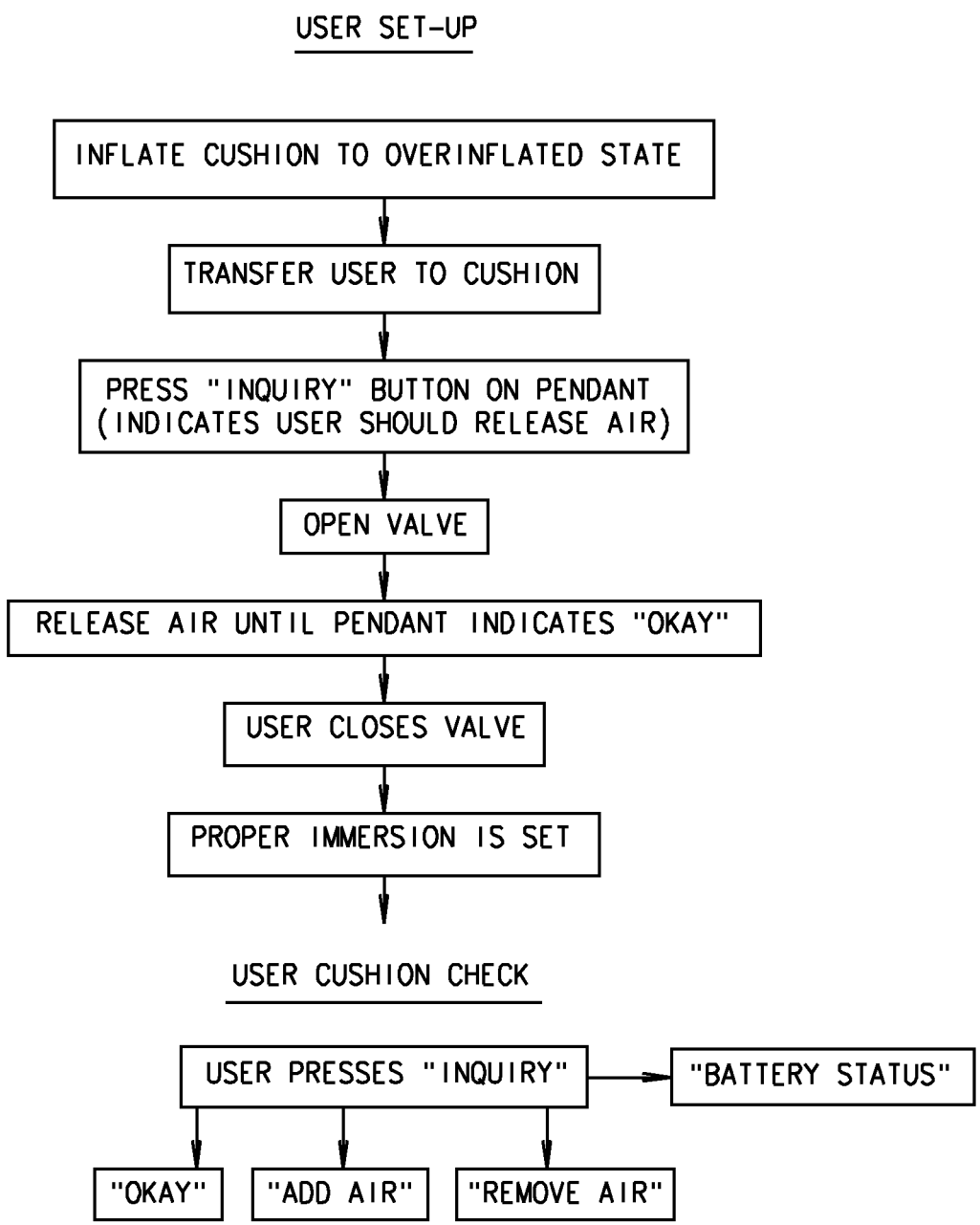
FIG. 4 is flow chart showing the steps of one aspect of cushion set up and checking.
Figure 5:
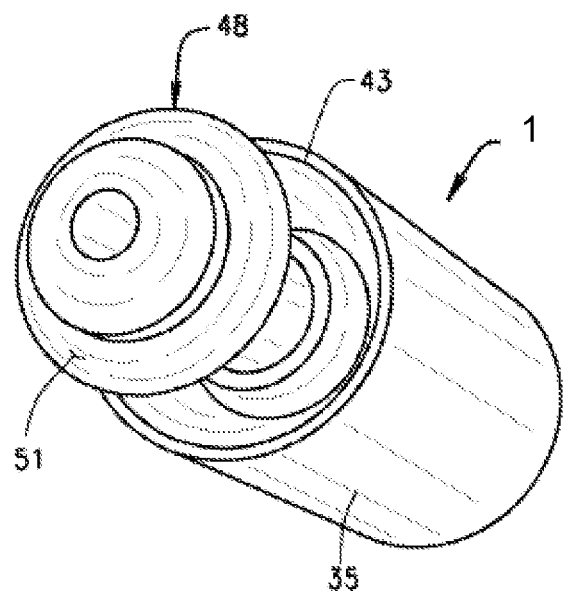
FIG. 5 is a proximal end perspective view of one aspect of a reduced outflow valve.
Figure 6:
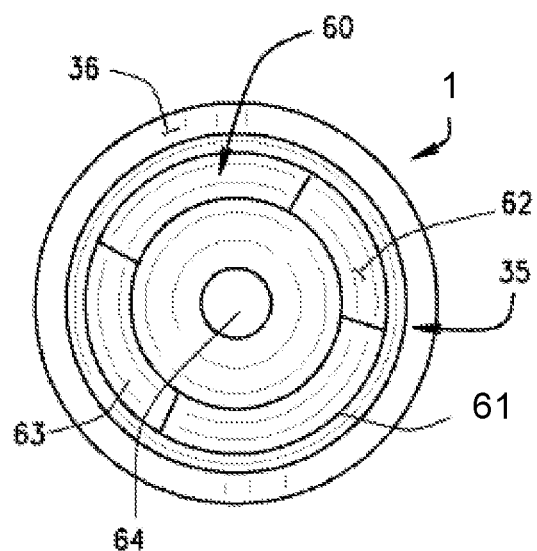
FIG. 6 is a proximal end perspective view of the reduced outflow valve of FIG. 5.

Set-up of the cushion using a sensor 10 is indicated generally by the steps in flowchart FIG. 4:

The user or care giver first overinflates cushion A.

The user is seated on the cushion A.

Next, the user or caregiver pushes an inquiry button 26.

Because cushion A is overinflated, sensor 10 should indicate the action needed, which is remove air. In the illustrated embodiment, remove air (down arrow) icon 28 will be illuminated to indicate the user should bleed air from the cushion through inflation valve 8, for example. The release of air through valve 8 is controlled by the novel reduced outflow valve, which will be described in detail below.

Once the user is properly immersed in cushion A, sensor 1 will indicate same. In the illustrated embodiment this indication occurs when the LED by the check mark 30 is illuminated.

The user closes valve 8 and proper immersion for the user is set.

In the unlikely event the user releases too much air and overshoots proper immersion, sensor 10 will indicate more air needs to be pumped into the cushion through valve 8. The steps of FIG. 4 are repeated until the sensor indicates proper immersion. As mentioned above, operation of sensor 10, for example, will benefit from the use of reduced outflow valve 1 to control release of air through valve 8 and make it easier to hit optimal internal pressure for optimal immersion and not overshoot the optimal internal pressure.

One aspect of a reduced outflow valve 1 is shown in FIGS. 5 through 8. Valve 1 has a valve body 35 comprising cylindrical wall 36 which has a substantially uniform thickness along its longitudinal dimension. Wall 36 is sized and dimensioned to fit within inflation tube 6 with a snug friction fit. Cylindrical wall 36 defines an inner bore 39. There is an internal circumferential shoulder 40 at a first end of the body. Shoulder 40 defines a circular opening 42 which is in communication with bore 39. There is a tapered counter bore 43 in the first end of the body in communication with opening 42. The opposite or second end of body 35 defines a circular opening 46. As shown, opening 42 is smaller in diameter than opening 46.

There is a plunger 48 slidingly engaged within bore 39 such that it can slide or move back and forth longitudinally within bore 39. Plunger 48, which may also be referred to as a piston, a slide, a baffle or the like, has an elongated body 50 with a flange 51 at a first or distal end comprising a first circumferential shoulder 52 and a second spaced apart circumferential shoulder 54 adjacent the first shoulder. The juncture of these two circumferential shoulders defines seat 56 for an O-ring seal 58. O-ring 58 is dimensioned to fit within counter bore 43 when plunger 48 slides toward the second end of body 35 within bore 39. There is a stop 59 comprised pair of opposed arcuate shoulders 60, 61 at the extreme proximal end of the plunger. Shoulder 60 and 61 define air flow spaces 62, 63 between them. The radial expanse of shoulders 60 and 61 is greater than the diameter of circumferential shoulder 40 inside wall 36. Plunger 48 defines an inner bore 64 that extends the entire length of the plunger. Bore 64 is a substantially uniform diameter along its longitudinal expanse and relatively small in diameter.

As best seen in FIG. 7, valve 1 is dimensioned to fit snugly within the bore 66 of inflation tube 6. As shown, inflation valve 8 with an associated stepped fitting 67 is inserted into the open end of the inflation tube and held securely in place. However, any method or apparatus for attaching an inflation valve to the tube is appropriate. Valve 1 is orientated within bore 66 of the tube such that opening 46 is orientated toward inflation valve 8. When air is introduced through valve 8 to inflate the cushion, for example by a pump, the force of the pump air urges plunger 48 axially within bore 39 to a first position where shoulders 60 and 61 of stop 59 abut shoulder 40 as seen in FIG. 8. The air is pumped through air flow spaces 62 and 63 and through plunger bore 64 relatively unimpeded.

However, when the cushion is overinflated and the user opens valve 8 to release air from the cushion, the force of the air toward valve 8 forces plunger 48 to move axially in bore 39 to a second position where O-ring 58 seats in counter bore 43 to effectively block air flow through the bleeder valve except for flow through plunger bore 64. Although the O-ring/shoulder/counter bore arrangement works well for its intended purpose, any elements that effectively stops axial movement of plunger 48 in bore 39 will suffice. Air flow out of the cushion is impeded or dampened, which helps prevent rapid deflation of the cushion. Hence, valve 1 allows for more rapid inflation of the cushion and slower deflation of the cushion.

Another aspect of a reduced outflow valve is indicated generally by number 70 in FIGS. 9 through 12. It should be noted valve 70 comprises only two parts. Valve 70 has a cylindrical body 72 comprising a cylindrical wall 73 defining a longitudinal inner bore 74. Body 72 is sized and dimensioned to seat snugly within bore 66 of inflation tube 6. There is a circumferential shoulder 76 inside wall 73 at the approximate mid-point of the wall. As shown, shoulder 76 is beveled, having angled wall 78 on its distal side and a flat face 79 on its proximal side.

There is a reduced outflow valve plunger 80 slidingly engaged in bore 74. As shown, plunger 80 comprises an elongated cylindrical body 82 defining a longitudinal bore 84. There is a circular flange 86 at the distal end of the body. Flange 86 has angled or bevel edge 87 on its distal side and a concentric hole 88 in fluid communication with bore 84. There is a plurality of radial stops 90 at the proximal end of body 82 positioned equal distances around the body. The stops define open airflow passages 92 between the stops.

Figure 9:
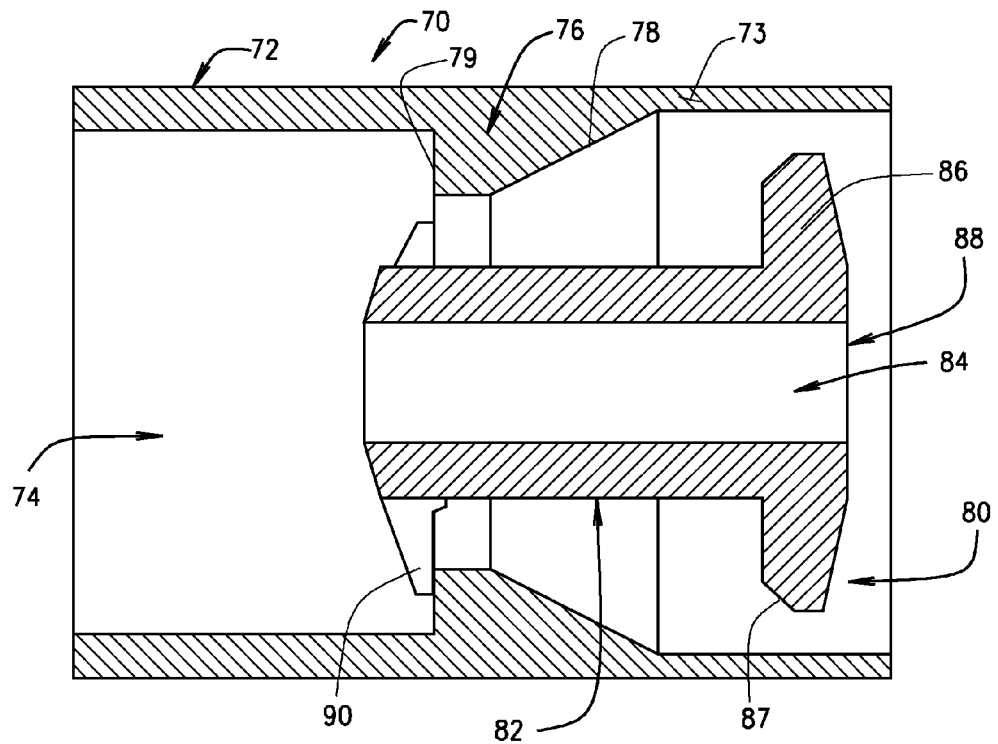
FIG. 9 is an enlarged cross-sectional view of another aspect of the reduced outflow valve in an open position.
Figure 10:
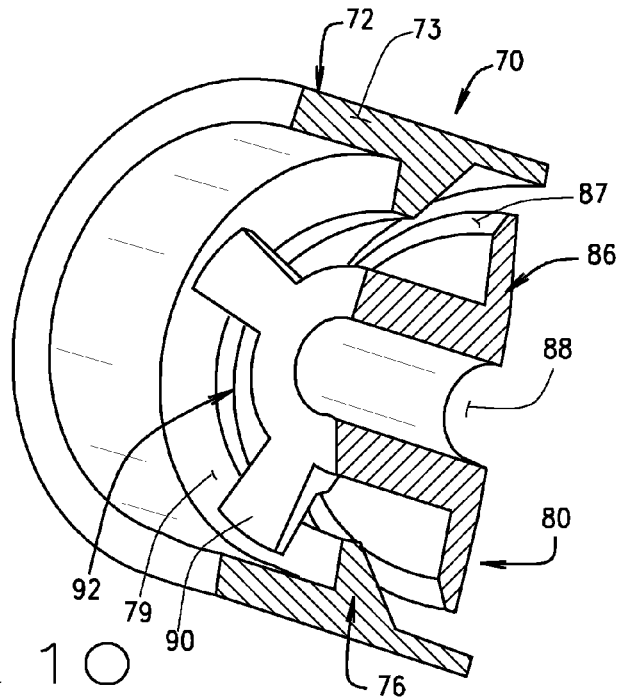
FIG. 10 is a partial proximal end perspective view of the reduced outflow valve of FIG. 9.
Figure 11:
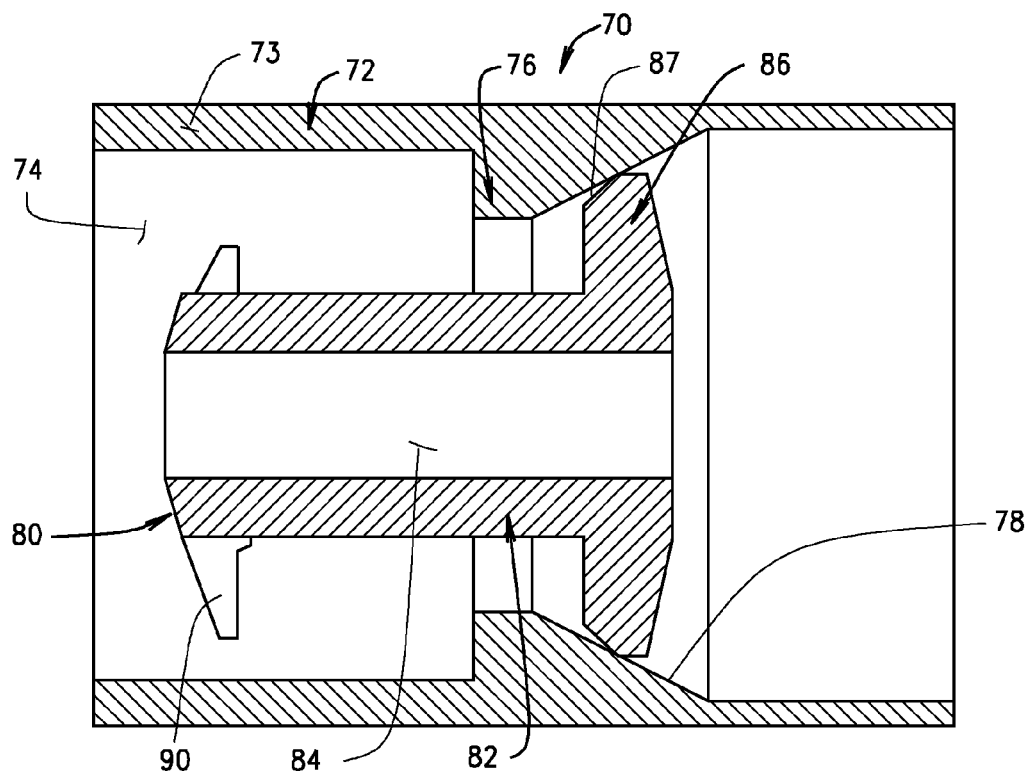
FIG. 11 is a cross-sectional view of the reduced outflow valve of FIG. 9 in a flow restricted position.
Figure 12:
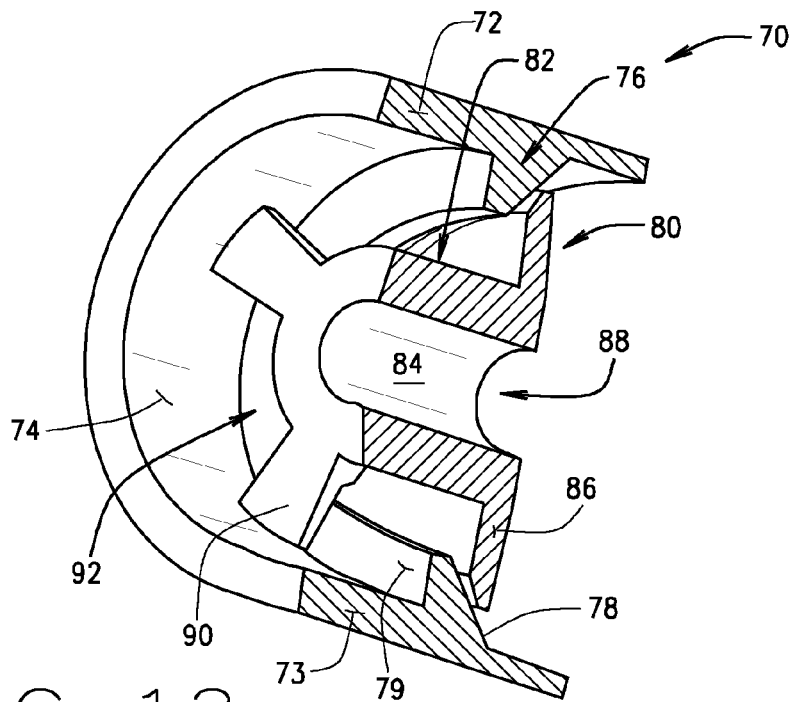
FIG. 12 is a partial proximal end perspective view of the reduced outflow valve of FIG. 11.

As seen in FIGS. 9 and 10, when air is introduced into the inflation tube, plunger 80 is pushed toward the distal end of bore 74. Stops 90 abut flat face 79 of shoulder 76, which halts movement of the plunger. Air flows through airflow passages 92 between the stops and through bore 84 of plunger 80, allowing relatively rapid inflation of the cushion. As best seen in FIGS. 11 and 12, when the air inflation valve 8 is opened to release air from the cushion, the force of the air moves plunger 80 proximally within bore 74. Beveled edge 87 of flange 86 abuts angled wall 78 on shoulder 76, effectively sealing bore 74 around the flange. Egressing air only can escape through hole 88 and bore 84, thereby damping airflow out of the cushion.

As shown in FIGS. 9 and 11, plunger 80 is totally contained within body 72 in either the first or the second position. It does not extend out of the body. This design prevents the plunger from catching or sticking on the inner air conduit wall and malfunction. All movement of the plunger 80 takes place within bore 74.

Yet another aspect of valve is indicated by reference number 100 in FIGS. 13 through 19. This aspect of the valve also comprises two elements. Valve 100 has a cylindrical body 101 comprising a cylindrical wall 102 defining a longitudinal inner bore 103. Wall 102 is sized and dimensioned to seat snugly within bore 66 of inflation tube 6. The outer proximal surface 104 of wall 102 in the aspect shown in FIGS. 13 through 15 has a plurality of longitudinally orientated ribs 105 spaced around the circumference to facilitate orientation and engagement within bore 66. There is a circumferential shoulder 106 on the inner surface of wall 102 at the approximate mid-point of the wall. As shown, shoulder 106 is beveled, having angled wall 107 on its distal side and a flat face 108 on its proximal side.

There is a reduced outflow valve plunger 109 slidingly engaged in bore 103. As shown plunger 109 comprises an elongated cylindrical body 110. There is a flange 112 at distal end of the body 110. Flange 112 is substantially rectangular in configuration having spacers or ears 114 at each corner and a beveled edge 118 on its proximal side. Ears 114 function as spacers to keep the plunger properly positioned in bore 103. Beveled edge 118 is complementary to angled wall 107. There is a plurality of radial stops 120 at the proximal end of body 110 positioned equal distances around the body. The stops define open airflow passages 122 between the stops. Stops 120 also function to center the plunger in bore 103, particularly if there are three or more stops. As best seen in FIG. 14, when flange 112 is seated against angled wall 107 it defines two lateral airflow spaces 124 and 126.

Figure 16:
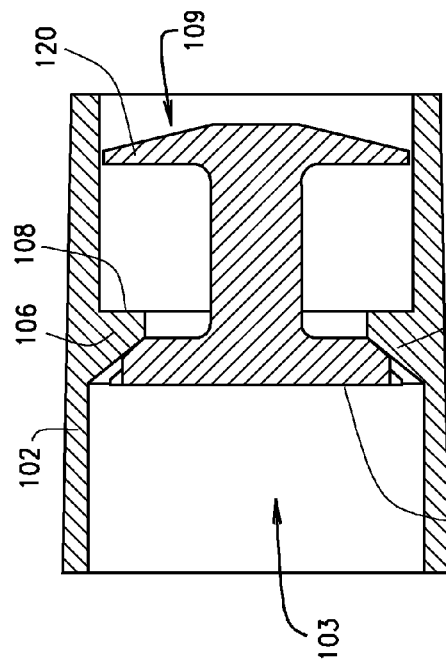
FIG. 16 is a cross-sectional view of the reduced outflow valve of FIG. 15 in an inflate position.
Figure 17:
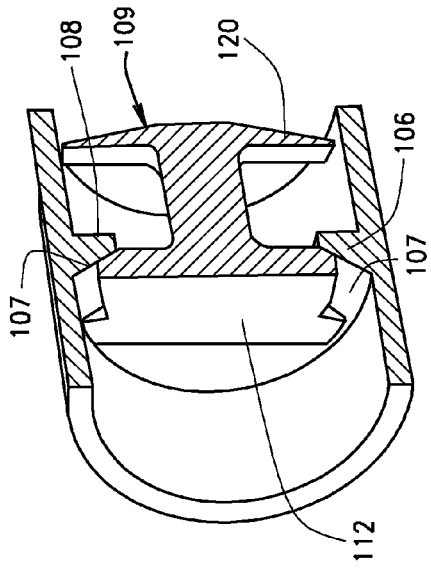
FIG. 17 is a distal end perspective cross-sectional view thereof.
Figure 18:
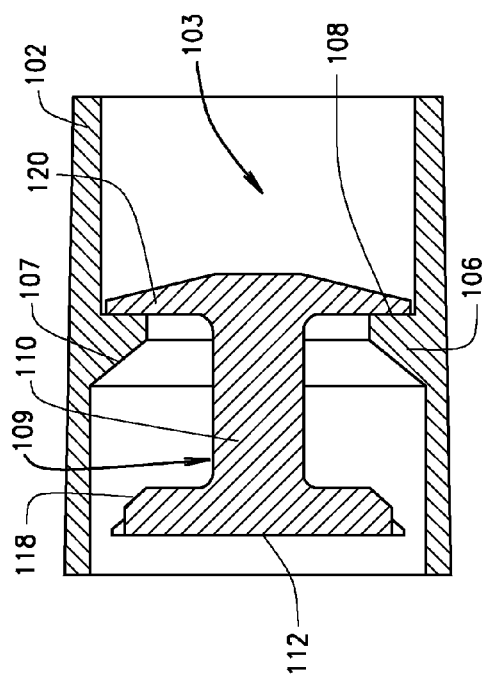
FIG. 18 is a cross-sectional view of the reduced outflow valve of FIG. 15 in a flow restricted position.
Figure 19:
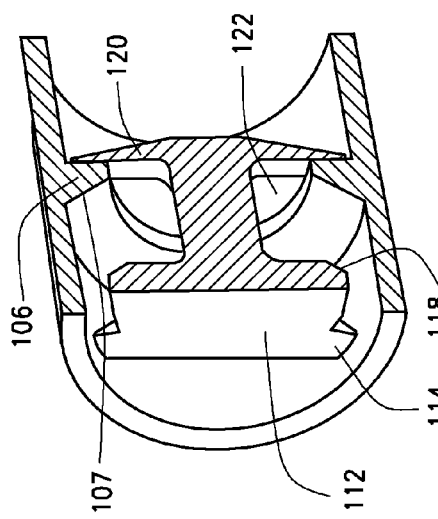
FIG. 19 is a distal end perspective cross-sectional view thereof in a flow restricted position.

As seen in FIGS. 16 and 17, when air is introduced into the inflation tube, plunger 109 is urged toward the distal end of bore 103 such that the plunger is in a first position. Stops 120 abut flat face 108 of shoulder 106, which halts movement of the plunger. Air flows through bore 103, through airflow passages 122 between the stops and around flange 112 allowing relatively rapid inflation of the cushion. As best seen in FIGS. 18 and 19, when the air inflation valve 8 is opened to release air from the cushion, the force of the air against flange 112 urges plunger 109 proximally within bore 103 to a second position. Beveled edge 118 of flange 112 abuts angled wall 107 on shoulder 106. Egressing air only can escape through lateral airflow spaces 124 and 126 at the edges of flange thereby damping and controlling airflow out of the cushion.

The aspect of valve 100 comprises two components. Furthermore, the plunger is positioned entirely within the body in both the first and the second positons, thereby preventing catching or sticking of the plunger in the airflow conduit or inflation valve in which valve 100 is installed or included.

As can be seen by the foregoing, the various aspects of the slow release valve can be employed to control egress of air from an inflatable apparatus of any time and for any purpose. Moreover, although the various valves are described in association with an air conduit, the valve may be employed as a component of inflation valve 8 or any other structure as long as the valve is in fluid communication with the inflatable apparatus. Also, while illustrated aspects of the valve employ plungers with a flanges at one end and stops at the other of certain configurations, any flange or stop, or number of stops, that function as intended are within the scope of the appended claims.

The invention claimed is:

1. A reduced outflow valve for installation in fluid communication with an inflatable apparatus comprising:
   a tubular body defining an inner bore; and
   a plunger slidingly engaged in the bore, the plunger defining an inner longitudinal bore that extends the length of the plunger, wherein the plunger has an elongated body, a flange at a first end of the body and at least one stop at a second end of the body;
   wherein inflation of the inflatable apparatus urges the plunger to a first position where it is disposed within the bore to allow ingress of air into the inflatable apparatus to inflate the inflatable apparatus; and
   wherein deflation of the inflatable apparatus urges the plunger to a second position wherein it is disposed within the bore to dampen the egress of air from the inflatable apparatus.

2. The reduced outflow valve of claim 1 wherein the valve is positioned in an inflation tubing.

3. The reduced outflow valve of claim 1 wherein the flange further comprises an O-ring.

4. The reduced outflow valve of claim 1 wherein the at least one stop at the second end of the plunger further comprises an array of radially extending stops defining airflow pathways between the stops.

5. The reduced outflow valve of claim 1 wherein the flange at the first end of the plunger comprises a substantially rectangular configuration.

6. The reduced outflow valve of claim 1 wherein one exterior end of the tubular body comprises an array of longitudinally disposed ribs.

7. The reduced outflow valve of claim 1 wherein the tubular body further comprises a wall having an internal circumferential shoulder, said shoulder having a diameter less than the diameter of the inner bore, said shoulder is disposed as a stop for the plunger flange when said plunger is in the second position.

8. The reduced outflow valve of claim 7 wherein said shoulder is disposed as a stop for the plunger stop when said plunger is in the first position.

9. The reduced outflow valve of claim 1 wherein the flange at the first end of the plunger comprises a flange having a first circumferential shoulder and a second circumferential shoulder adjacent the first shoulder.

10. The reduced outflow valve of claim 9 wherein the plunger flange further comprises an O-ring seal between the first and second circumferential shoulders.

11. The reduced outflow valve of claim 1 wherein the plunger is contained within the body in both the first and the second positions.

12. The reduced outflow valve of claim 11 further comprising a flange at a first end of the plunger and at least one stop at a second end of the plunger.

13. An inflatable apparatus having a reduced outflow valve positioned in the fluid communication with the inflatable apparatus, the reduced outflow valve comprising:
    a tubular body defining an inner bore; and
    a plunger slidingly engaged in the bore, the plunger having an elongated body with first end and a second, a flange at the first end, at least one stop at the second end, and an inner longitudinal bore that extends the length of the plunger;
    wherein inflation of the inflatable apparatus urges the plunger to a first position within the bore to allow ingress of air into the inflatable apparatus to inflate the inflatable apparatus; and
    wherein deflation of the inflatable apparatus urges the plunger to a second position within the bore to dampen the egress of air from the inflatable apparatus.

14. The inflatable apparatus of claim 13 wherein the flange is substantially rectangular.

15. The inflatable apparatus of claim 13 wherein the stop further comprises an array of radially extending stops.

16. A method of inflating and deflating an inflatable apparatus having at least one airflow conduit in fluid communication with the apparatus, the method comprising:
    introducing air through the airflow conduit to the inflatable apparatus, said airflow conduit comprising a reduced outflow valve, said reduced outflow valve having a tubular body with a plunger slidingly engaged in the tubular body, the plunger defining an inner longitudinal bore that extends the length of the plunger, whereby the introduced air urges the plunger within the tubular body to a first position allowing substantially unimpeded airflow through the valve and into the inflatable apparatus; and
    allowing air to egress from the inflatable apparatus, whereby the egressing air urges the plunger within the tubular body to a second position to impede airflow through the valve to reduce the rate of air outflow from the inflatable apparatus.

17. The method of claim 16 further comprising inflating and deflating the inflatable apparatus through an inflation valve, wherein the reduced outflow valve is a component of the inflation valve.

18. A reduced outflow valve for installation in fluid communication with an inflatable apparatus comprising:
    a tubular body defining an inner bore; and
    a plunger having an elongated body, a flange at a first end of the body and an array of radially extending stops defining airflow pathways between the stops at a second end of the plunger, and an inner longitudinal bore that extends the length of the plunger, said plunger slidingly engaged in the bore;
    wherein inflation of the inflatable apparatus urges the plunger to a first position where it is disposed within the bore to allow ingress of air into the inflatable apparatus to inflate the inflatable apparatus; and
    wherein deflation of the inflatable apparatus urges the plunger to a second position wherein it is disposed within the bore to dampen the egress of air from the inflatable apparatus.

* * * * *